(12) United States Patent
Suzuki

(10) Patent No.: US 11,718,129 B2
(45) Date of Patent: Aug. 8, 2023

(54) PNEUMATIC TIRE

(71) Applicant: The Yokohama Rubber Co., LTD., Tokyo (JP)

(72) Inventor: Takayuki Suzuki, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 785 days.

(21) Appl. No.: 16/091,506

(22) PCT Filed: Aug. 30, 2017

(86) PCT No.: PCT/JP2017/031127
§ 371 (c)(1),
(2) Date: Oct. 4, 2018

(87) PCT Pub. No.: WO2018/043553
PCT Pub. Date: Mar. 8, 2018

(65) Prior Publication Data
US 2019/0118581 A1     Apr. 25, 2019

(30) Foreign Application Priority Data

Aug. 31, 2016  (JP) .............................. JP2016-170230

(51) Int. Cl.
*B60C 11/11*  (2006.01)
*B60C 11/12*  (2006.01)
(Continued)

(52) U.S. Cl.
CPC .......... *B60C 11/0302* (2013.01); *B60C 11/03* (2013.01); *B60C 11/0306* (2013.01);
(Continued)

(58) Field of Classification Search
CPC ............. B60C 11/1236; B60C 11/0302; B60C 11/1204; B60C 11/1259; B60C 2011/1245; B60C 2011/1213; B60C 2011/1268
See application file for complete search history.

(56) References Cited

U.S. PATENT DOCUMENTS 6,386,253 B1    5/2002  Marriott
2008/0105349 A1  5/2008  Yoshida
(Continued)

FOREIGN PATENT DOCUMENTS

DE            3329320 A1 *  2/1985
DE    10 2005 030 566      2/2006
(Continued)

OTHER PUBLICATIONS

Machine translation for Japan 2005-153812 (Year: 2021).*
(Continued)

*Primary Examiner* — Steven D Maki
(74) *Attorney, Agent, or Firm* — Thorpe North & Western

(57) ABSTRACT

A pneumatic tire includes a tread surface, a plurality of circumferential main grooves formed on the tread surface and extending in a tire circumference direction, a plurality of lug grooves formed on the tread surface and extending in a tire lateral direction, a plurality of blocks defined by the lug grooves on both sides in the tire circumferential direction and by the circumferential main grooves on at least one end in the tire lateral direction, and narrow grooves formed in the blocks. The narrow grooves include a plurality of bent portions as well as a circumferential narrow groove extending in the tire circumference direction and a lateral narrow groove extending in the tire lateral direction. The lateral narrow groove and the circumferential narrow groove are configured so that at least one thereof is provided in a
(Continued)

plurality and includes a plurality of intersection points where the one intersects the other.

22 Claims, 11 Drawing Sheets

(51) Int. Cl.
*B60C 11/03* (2006.01)
*B60C 11/13* (2006.01)

(52) U.S. Cl.
CPC .............. *B60C 11/11* (2013.01); *B60C 11/12* (2013.01); *B60C 11/1204* (2013.01); *B60C 11/1236* (2013.01); *B60C 11/1259* (2013.01); *B60C 11/13* (2013.01); *B60C 2011/036* (2013.01); *B60C 2011/0346* (2013.01); *B60C 2011/0348* (2013.01); *B60C 2011/0351* (2013.01); *B60C 2011/0362* (2013.01); *B60C 2011/0369* (2013.01); *B60C 2011/1213* (2013.01); *B60C 2011/1245* (2013.01); *B60C 2011/1268* (2013.01); *B60C 2200/06* (2013.01)

(56) References Cited

U.S. PATENT DOCUMENTS

| | | | |
|---|---|---|---|
| 2010/0252158 A1 | 10/2010 | Haga | |
| 2011/0226397 A1* | 9/2011 | Hamada | B60C 11/11 152/209.18 |
| 2015/0283861 A1 | 10/2015 | Momozu | |
| 2016/0068024 A1 | 3/2016 | Furusawa | |
| 2016/0311266 A1 | 10/2016 | Kaneko | |
| 2017/0267030 A1 | 9/2017 | Suzuki et al. | |
| 2019/0092102 A1* | 3/2019 | Iga | B60C 11/1369 |
| 2019/0126686 A1* | 5/2019 | Asano | B60C 11/1204 |
| 2019/0126687 A1* | 5/2019 | Asano | B60C 11/0306 |

FOREIGN PATENT DOCUMENTS

| | | | |
|---|---|---|---|
| DE | 10 2010 001 898 | | 9/2010 |
| FR | 3 014 750 | | 6/2015 |
| JP | 62-292508 A | * | 12/1987 |
| JP | 03-090317 A | * | 4/1991 |
| JP | 06-171319 A | * | 6/1994 |
| JP | 2000-247112 A | * | 9/2000 |
| JP | 2005-153812 A | * | 6/2005 |
| JP | 2006-160158 | | 6/2006 |
| JP | 5530059 | | 6/2014 |
| JP | 2014-210460 | | 11/2014 |
| WO | WO 2006/062156 | | 6/2006 |
| WO | WO 2009/057663 | | 5/2009 |
| WO | WO 2014/061514 | | 4/2014 |
| WO | WO-2014/102136 A1 | * | 7/2014 |
| WO | WO 2014/171379 | | 10/2014 |
| WO | WO 2015/091331 | | 6/2015 |
| WO | WO 2016/027647 | | 2/2016 |
| WO | WO 2016/035659 | | 3/2016 |

OTHER PUBLICATIONS

Machine translation for Japan 2000-247112 (Year: 2021).*
Machine translation for Japan 62-292508 (Year: 2021).*
Machine translation for Japan 06-171319 (Year: 2021).*
Machine translation for WO 2014/102136 (Year: 2021).*
Machine translation for German 3,329,320 (Year: 2021).*
Machine translation for Japan 03-090317 (Year: 2022).*
International Search Report for International Application No. PCT/JP2017/031127 dated Dec. 5, 2017, 4 pages, Japan.
European Office Action for European Application No. 17846557.1 dated Feb. 26, 2020, 7 pages, Germany.

* cited by examiner

| SPECIFIED CONTENTS | CONVENTIONAL EXAMPLE | EXAMPLE 1 | EXAMPLE 2 | EXAMPLE 3 | EXAMPLE 4 | EXAMPLE 5 |
|---|---|---|---|---|---|---|
| NUMBER OF BENT PORTIONS | 2 | 2 | 2 | 2 | 2 | 2 |
| NUMBER OF INTERSECTION POINTS | 0 | 2 | 2 | 2 | 2 | 2 |
| POSITIONAL RELATIONSHIP BETWEEN BENT PORTION AND INTERSECTION POINT | - | INTERSECTION POINT ON INNER SIDE | INTERSECTION POINT ON OUTER SIDE | INTERSECTION POINT ON OUTER SIDE | INTERSECTION POINT ON OUTER SIDE | INTERSECTION POINT ON OUTER SIDE |
| NARROW GROOVE OPENS TO CIRCUMFERENTIAL MAIN GROOVE | OPENING | NO OPENING | NO OPENING | OPENING | OPENING | OPENING |
| $W3/WB$ | - | - | - | 0.1 | 0.5 | 0.15 |
| $W4/WB$ | - | - | - | 0.1 | 0.5 | 0.15 |
| $d1/d2$ | 0.7 | 0.6 | 0.6 | 0.6 | 0.6 | 0.6 |
| $d3/d4$ | - | 1.0 | 1.0 | 1.0 | 1.0 | 1.0 |
| $\beta1$ | - | 60° | 60° | 60° | 60° | 60° |
| $\beta2$ | - | 60° | 60° | 60° | 60° | 60° |
| $\alpha1$ | 125° | 80° | 80° | 80° | 80° | 80° |
| $\alpha2$ | 125° | 80° | 80° | 80° | 80° | 80° |
| BLOCK ROW WHERE NARROW GROOVE IS ARRANGED | 0 | 1 | 1 | 1 | 1 | 1 |
| DIRECTIONALITY | YES | NO | NO | NO | NO | NO |
| PERFORMANCE ON SNOW AND ICE | 100 | 105 | 106 | 109 | 108 | 110 |
| PASS-BY NOISE (DB) | 79.0 | 77.8 | 77.9 | 77.8 | 77.7 | 77.6 |
| CRACK FROM NARROW GROOVE (BLOCK BREAKAGE) | 100 | 100 | 100 | 98 | 100 | 100 |

FIG. 6A

| SPECIFIED CONTENTS | EXAMPLE 6 | EXAMPLE 7 | EXAMPLE 8 | EXAMPLE 9 | EXAMPLE 10 | EXAMPLE 11 |
|---|---|---|---|---|---|---|
| NUMBER OF BENT PORTIONS | 2 | 2 | 2 | 2 | 2 | 2 |
| NUMBER OF INTERSECTION POINTS | 2 | 2 | 2 | 2 | 2 | 2 |
| POSITIONAL RELATIONSHIP BETWEEN BENT PORTION AND INTERSECTION POINT | INTERSECTION POINT ON OUTER SIDE | INTERSECTION POINT ON OUTER SIDE | INTERSECTION POINT ON OUTER SIDE | INTERSECTION POINT ON OUTER SIDE | INTERSECTION POINT ON OUTER SIDE | INTERSECTION POINT ON OUTER SIDE |
| NARROW GROOVE OPENS TO CIRCUMFERENTIAL MAIN GROOVE | OPENING | OPENING | OPENING | OPENING | OPENING | OPENING |
| W3/WB | 0.3 | 0.4 | 0.15 | 0.3 | 0.4 | 0.15 |
| W4/WB | 0.3 | 0.4 | 0.15 | 0.3 | 0.4 | 0.4 |
| d1/d2 | 0.6 | 0.6 | 0.04 | 0.04 | 0.04 | 0.6 |
| d3/d4 | 1.0 | 1.0 | 1.0 | 1.0 | 1.0 | 1.0 |
| $\beta 1$ | 60° | 60° | 60° | 60° | 60° | 60° |
| $\beta 2$ | 60° | 60° | 60° | 60° | 60° | 60° |
| $\alpha 1$ | 80° | 80° | 80° | 80° | 80° | 80° |
| $\alpha 2$ | 80° | 80° | 80° | 80° | 80° | 80° |
| BLOCK ROW WHERE NARROW GROOVE IS ARRANGED | 1 | 1 | 1 | 1 | 1 | 1 |
| DIRECTIONALITY | NO | NO | NO | NO | NO | NO |
| PERFORMANCE ON SNOW AND ICE | 110 | 109 | 110 | 109 | 108 | 109 |
| PASS-BY NOISE (DB) | 77.8 | 77.7 | 77.3 | 77.2 | 77.3 | 77.4 |
| CRACK FROM NARROW GROOVE (BLOCK BREAKAGE) | 100 | 100 | 99 | 100 | 100 | 100 |

FIG. 6B

| SPECIFIED CONTENTS | EXAMPLE 12 | EXAMPLE 13 | EXAMPLE 14 | EXAMPLE 15 | EXAMPLE 16 | EXAMPLE 17 |
|---|---|---|---|---|---|---|
| NUMBER OF BENT PORTIONS | 2 | 2 | 2 | 2 | 2 | 2 |
| NUMBER OF INTERSECTION POINTS | 2 | 2 | 2 | 2 | 2 | 2 |
| POSITIONAL RELATIONSHIP BETWEEN BENT PORTION AND INTERSECTION POINT | INTERSECTION POINT ON OUTER SIDE | INTERSECTION POINT ON OUTER SIDE | INTERSECTION POINT ON OUTER SIDE | INTERSECTION POINT ON OUTER SIDE | INTERSECTION POINT ON OUTER SIDE | INTERSECTION POINT ON OUTER SIDE |
| NARROW GROOVE OPENS TO CIRCUMFERENTIAL MAIN GROOVE | OPENING | OPENING | OPENING | OPENING | OPENING | OPENING |
| W3/WB | 0.4 | 0.3 | 0.3 | 0.3 | 0.3 | 0.3 |
| W4/WB | 0.15 | 0.3 | 0.3 | 0.3 | 0.3 | 0.3 |
| d1/d2 | 0.6 | 0.05 | 0.3 | 0.5 | 0.05 | 0.3 |
| d3/d4 | 1.0 | 1.0 | 1.0 | 1.0 | 0.4 | 0.4 |
| β1 | 60° | 60° | 60° | 60° | 60° | 60° |
| β2 | 60° | 60° | 60° | 60° | 60° | 60° |
| α1 | 80° | 80° | 80° | 80° | 80° | 80° |
| α2 | 80° | 80° | 80° | 80° | 80° | 80° |
| BLOCK ROW WHERE NARROW GROOVE IS ARRANGED | 1 | 1 | 1 | 1 | 1 | 1 |
| DIRECTIONALITY | NO | NO | NO | NO | NO | NO |
| PERFORMANCE ON SNOW AND ICE | 109 | 108 | 109 | 110 | 106 | 109 |
| PASS-BY NOISE (DB) | 77.2 | 76.6 | 76.8 | 76.9 | 76.1 | 76.3 |
| CRACK FROM NARROW GROOVE (BLOCK BREAKAGE) | 100 | 100 | 100 | 100 | 100 | 100 |

FIG. 6C

| SPECIFIED CONTENTS | EXAMPLE 18 | EXAMPLE 19 | EXAMPLE 20 | EXAMPLE 21 | EXAMPLE 22 | EXAMPLE 23 |
|---|---|---|---|---|---|---|
| NUMBER OF BENT PORTIONS | 2 | 2 | 2 | 2 | 2 | 2 |
| NUMBER OF INTERSECTION POINTS | 2 | 2 | 2 | 2 | 2 | 2 |
| POSITIONAL RELATIONSHIP BETWEEN BENT PORTION AND INTERSECTION POINT | INTERSECTION POINT ON OUTER SIDE | INTERSECTION POINT ON OUTER SIDE | INTERSECTION POINT ON OUTER SIDE | INTERSECTION POINT ON OUTER SIDE | INTERSECTION POINT ON OUTER SIDE | INTERSECTION POINT ON OUTER SIDE |
| NARROW GROOVE OPENS TO CIRCUMFERENTIAL MAIN GROOVE | OPENING | OPENING | OPENING | OPENING | OPENING | OPENING |
| W3/WB | 0.3 | 0.3 | 0.3 | 0.3 | 0.3 | 0.3 |
| W4/WB | 0.3 | 0.3 | 0.3 | 0.3 | 0.3 | 0.3 |
| d1/d2 | 0.5 | 0.3 | 0.3 | 0.3 | 0.3 | 0.3 |
| d3/d4 | 0.4 | 0.5 | 0.7 | 0.8 | 0.7 | 0.7 |
| β1 | 60° | 60° | 60° | 60° | 70° | 80° |
| β2 | 60° | 60° | 60° | 60° | 70° | 80° |
| α1 | 80° | 80° | 80° | 80° | 80° | 80° |
| α2 | 80° | 80° | 80° | 80° | 80° | 80° |
| BLOCK ROW WHERE NARROW GROOVE IS ARRANGED | 1 | 1 | 1 | 1 | 1 | 1 |
| DIRECTIONALITY | NO | NO | NO | NO | NO | NO |
| PERFORMANCE ON SNOW AND ICE | 110 | 110 | 110 | 110 | 113 | 115 |
| PASS-BY NOISE (DB) | 76.2 | 75.8 | 75.8 | 75.9 | 75.6 | 75.5 |
| CRACK FROM NARROW GROOVE (BLOCK BREAKAGE) | 100 | 100 | 100 | 100 | 100 | 100 |

FIG. 6D

| SPECIFIED CONTENTS | EXAMPLE 24 | EXAMPLE 25 | EXAMPLE 26 | EXAMPLE 27 | EXAMPLE 28 | EXAMPLE 29 |
|---|---|---|---|---|---|---|
| NUMBER OF BENT PORTIONS | 2 | 2 | 2 | 2 | 2 | 2 |
| NUMBER OF INTERSECTION POINTS | 2 | 2 | 2 | 2 | 2 | 2 |
| POSITIONAL RELATIONSHIP BETWEEN BENT PORTION AND INTERSECTION POINT | INTERSECTION POINT ON OUTER SIDE | INTERSECTION POINT ON OUTER SIDE | INTERSECTION POINT ON OUTER SIDE | INTERSECTION POINT ON OUTER SIDE | INTERSECTION POINT ON OUTER SIDE | INTERSECTION POINT ON OUTER SIDE |
| NARROW GROOVE OPENS TO CIRCUMFERENTIAL MAIN GROOVE | OPENING | OPENING | OPENING | OPENING | OPENING | OPENING |
| W3/WB | 0.3 | 0.3 | 0.3 | 0.3 | 0.3 | 0.3 |
| W4/WB | 0.3 | 0.3 | 0.3 | 0.3 | 0.3 | 0.3 |
| d1/d2 | 0.3 | 0.3 | 0.3 | 0.3 | 0.3 | 0.3 |
| d3/d4 | 0.7 | 0.7 | 0.7 | 0.7 | 0.7 | 0.7 |
| $\beta1$ | 90° | 70° | 80° | 90° | 80° | 80° |
| $\beta2$ | 90° | 70° | 80° | 90° | 80° | 80° |
| $\alpha1$ | 80° | 130° | 130° | 130° | 90° | 100° |
| $\alpha2$ | 80° | 130° | 130° | 130° | 90° | 100° |
| BLOCK ROW WHERE NARROW GROOVE IS ARRANGED | 1 | 1 | 1 | 1 | 1 | 1 |
| DIRECTIONALITY | NO | NO | NO | NO | NO | NO |
| PERFORMANCE ON SNOW AND ICE | 115 | 116 | 117 | 118 | 116 | 120 |
| PASS-BY NOISE (DB) | 75.7 | 75.9 | 75.8 | 75.8 | 75.3 | 75.4 |
| CRACK FROM NARROW GROOVE (BLOCK BREAKAGE) | 100 | 100 | 100 | 100 | 100 | 100 |

FIG. 6E

| SPECIFIED CONTENTS | EXAMPLE 30 | EXAMPLE 31 | EXAMPLE 32 | EXAMPLE 33 |
|---|---|---|---|---|
| NUMBER OF BENT PORTIONS | 2 | 2 | 2 | 2 |
| NUMBER OF INTERSECTION POINTS | 2 | 2 | 2 | 2 |
| POSITIONAL RELATIONSHIP BETWEEN BENT PORTION AND INTERSECTION POINT | INTERSECTION POINT ON OUTER SIDE | INTERSECTION POINT ON OUTER SIDE | INTERSECTION POINT ON OUTER SIDE | INTERSECTION POINT ON OUTER SIDE |
| NARROW GROOVE OPENS TO CIRCUMFERENTIAL MAIN GROOVE | OPENING | OPENING | OPENING | OPENING |
| W3/WB | 0.3 | 0.3 | 0.3 | 0.3 |
| W4/WB | 0.3 | 0.3 | 0.3 | 0.3 |
| d1/d2 | 0.3 | 0.3 | 0.3 | 0.3 |
| d3/d4 | 0.7 | 0.7 | 0.7 | 0.7 |
| $\beta 1$ | 80° | 80° | 80° | 80° |
| $\beta 2$ | 80° | 80° | 80° | 80° |
| $\alpha 1$ | 120° | 100° | 100° | 100° |
| $\alpha 2$ | 120° | 100° | 100° | 100° |
| BLOCK ROW WHERE NARROW GROOVE IS ARRANGED | 1 | 2 | 4 | 4 |
| DIRECTIONALITY | NO | NO | NO | YES |
| PERFORMANCE ON SNOW AND ICE | 120 | 120 | 128 | 130 |
| PASS-BY NOISE (DB) | 75.3 | 74.9 | 75.0 | 74.5 |
| CRACK FROM NARROW GROOVE (BLOCK BREAKAGE) | 100 | 100 | 100 | 100 |

FIG. 6F

PNEUMATIC TIRE

TECHNICAL FIELD

The present technology relates to a pneumatic tire.

BACKGROUND ART

In a pneumatic tire, in order to discharge water between a tread surface and a road surface during running on wet road surfaces, a plurality of grooves are formed in the tread surface. These grooves in the tread surface, however, cause noise when a vehicle runs. Thus, among the pneumatic tires in the related art, there are tires that achieve reduced noise as a result of considerations made to a shape and an arrangement of the grooves. For example, in the pneumatic tire described in Japan Patent No. 5530059, outer longitudinal grooves positioned at or near both ends in a tire lateral direction are formed into zigzag shapes, and positions where the outer longitudinal grooves connect to lateral grooves, which are positioned on both sides of the outer longitudinal grooves in the tire lateral direction and connected to the outer longitudinal grooves from both sides of the outer longitudinal grooves, are made the same in a tire circumferential direction, thereby suppressing noise generation while maintaining wet performance.

Here, running performance on snow and ice may be required in the pneumatic tire. In such a pneumatic tire, the grooves formed in the tread surface not only include grooves that define blocks but also narrow grooves and the like in the blocks, for example, as in Japan Patent No. 5530059 in which sipes are provided in land portions. Such a configuration effectively increases edges on the tread surface. However, when narrow grooves and the like are provided in the blocks, compressed air flows into the narrow grooves when the blocks contact the ground, readily flowing to main grooves and readily producing noise. Thus, satisfaction of both performance on snow and ice and reduced noise has been extremely difficult.

SUMMARY

The present technology provides a pneumatic tire capable of improving performance on snow and ice and reducing noise in a compatible manner.

A pneumatic tire according to the present technology includes a tread surface, a plurality of circumferential main grooves formed on the tread surface and extending in a tire circumferential direction, a plurality of lug grooves formed on the tread surface and extending in a tire lateral direction, a plurality of blocks defined by the lug grooves on both sides in the tire circumferential direction and by the circumferential main grooves on at least one end portion in the tire lateral direction, and narrow grooves formed in the blocks. The narrow grooves include a plurality of bent portions as well as a circumferential narrow groove extending in the tire circumferential direction and a lateral narrow groove extending in the tire lateral direction. The lateral narrow groove and the circumferential narrow groove are configured so that at least one thereof is provided in a plurality and includes a plurality of intersection points where the one intersects the other.

Further, in the pneumatic tire described above, preferably the bent portions are each positioned between the intersection points in the tire lateral direction, the circumferential narrow groove opens to the lug groove, and the lateral narrow groove opens to the circumferential main groove.

Further, in the pneumatic tire described above, preferably the narrow groove opens to the respective lug grooves defining both sides of the block in the tire circumferential direction, and thus includes two opening portions. A distance W3 in the tire lateral direction between one of the two opening portions and, among both ends of the block in the tire lateral direction, an end portion near the opening portion is within a range of 0.15≤(W3/WB)≤0.40 with respect to a width WB of the block in the tire lateral direction. A distance W4 in the tire lateral direction between the other of the two opening portions and, among both ends of the block in the tire lateral direction, an end portion near the opening portion is within a range of 0.15≤(W4/WB)≤0.40 with respect to the width WB of the block in the tire lateral direction.

Further, in the pneumatic tire described above, preferably the narrow groove has a groove depth d1 within a range of 0.05≤(d1/d2)≤0.50 with respect to a groove depth d2 of the circumferential main groove.

Further, in the pneumatic tire described above, preferably the narrow grooves are configured so that a relationship between a groove depth d3 of the circumferential narrow groove and a groove depth d4 of the lateral narrow groove is within a range of 0.5≤(d3/d4)≤0.8.

Further, in the pneumatic tire described above, preferably the narrow groove includes two of the intersection points, and an angle β1 between the narrow grooves that intersect at one of the intersection points and an angle β2 between the narrow grooves that intersect at the other of the intersection points are within ranges of 70°≤β1≤90° and 70°≤β2≤90°, respectively.

Further, in the pneumatic tire described above, preferably the narrow groove includes two of the bent portions, and a bend angle α1 of the narrow groove at one of the bent portions and a bend angle α2 of the narrow groove at the other of the bent portions are within ranges of 90°≤α1≤120° and 90°≤α2≤120°, respectively.

Further, in the pneumatic tire described above, preferably the blocks are configured so that a plurality thereof are aligned in the tire circumferential direction, forming block rows, the tread surface is provided with a plurality of the block rows aligned in the tire lateral direction, and the narrow grooves are formed in the blocks of the plurality of block rows.

Further, in the pneumatic tire described above, preferably the tread surface is provided with six of the block rows, and the narrow grooves are formed in at least the blocks of four block rows, among the six block rows, other than the two block rows positioned on both end sides in the tire lateral direction.

Further, in the pneumatic tire described above, preferably the pneumatic tire has a specified rotation direction, and the bent portions bend such that a portion of the narrow groove positioned outward from the bent portion in the tire lateral direction is configured to bend further in directions positioned on a trailing side in a tire rotation direction than a portion of the narrow groove positioned inward from the bent portion in the tire lateral direction.

A pneumatic tire according to the present technology achieves the effect of improving performance on snow and ice and reducing noise in a compatible manner.

BRIEF DESCRIPTION OF DRAWINGS

FIG. 6A is a table showing the results of performance tests of pneumatic tires.

FIG. 6B is a table showing the results of performance tests of pneumatic tires.

FIG. 6C is a table showing the results of performance tests of pneumatic tires.

FIG. 6D is a table showing the results of performance tests of pneumatic tires.

FIG. 6E is a table showing the results of performance tests of pneumatic tires.

FIG. 6F is a table showing the results of performance tests of pneumatic tires.

DETAILED DESCRIPTION

Pneumatic tires according to embodiments of the present technology are described in detail below with reference to the drawings. However, the technology is not limited to these embodiments. Constituents of the following embodiments include elements that are essentially identical or that can be substituted or easily conceived by one skilled in the art.

Herein, "tire lateral direction" refers to the direction that is parallel with a rotation axis of a pneumatic tire. "Inward in the tire lateral direction" refers to the direction toward the tire equatorial plane in the tire lateral direction. "Outward in the tire lateral direction" refers to the direction opposite the direction toward the tire equatorial plane in the tire lateral direction. Further, "tire radial direction" refers to the direction orthogonal to the tire rotation axis. "Tire circumferential direction" refers to the direction of rotation with the tire rotation axis as the center of rotation.

Figure 1:
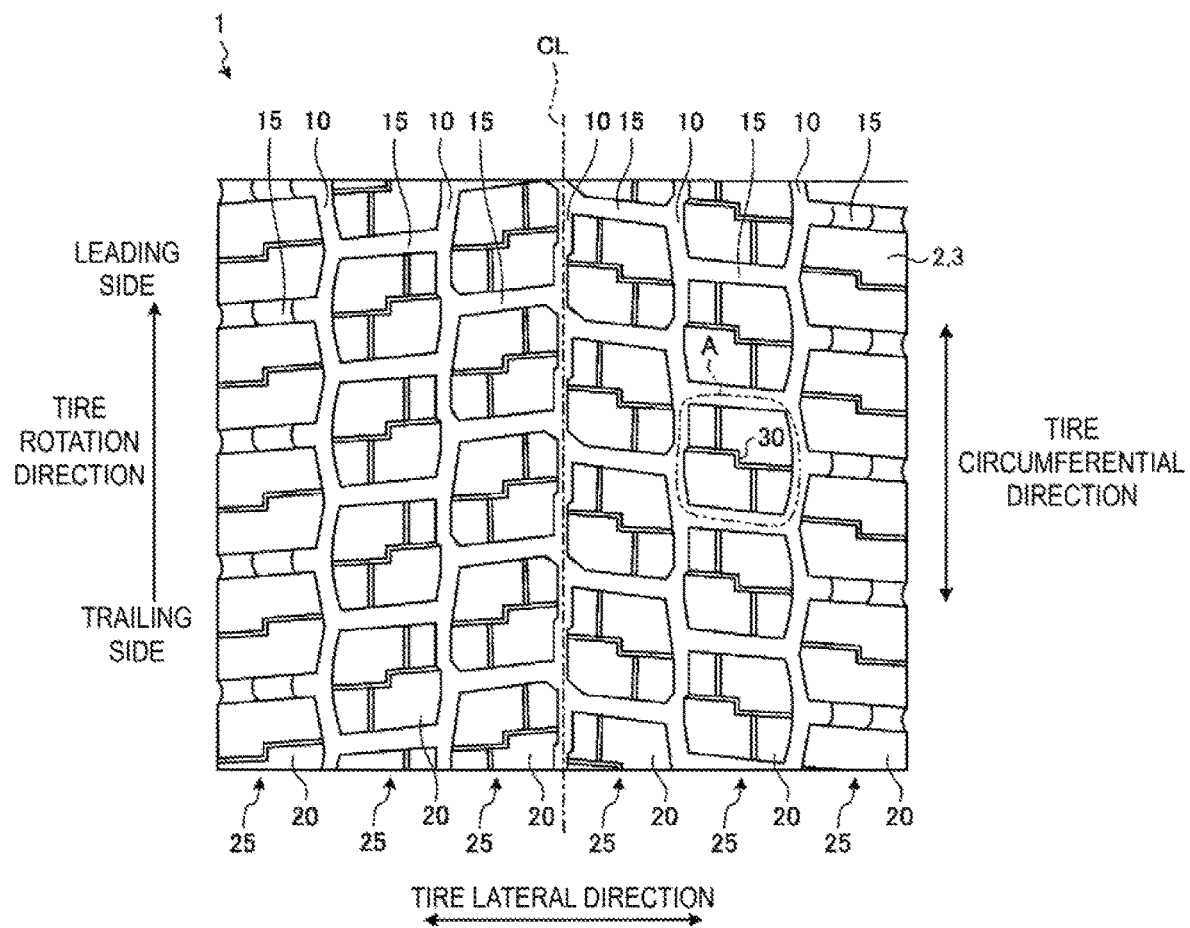
FIG. 1 is a plan view illustrating a tread surface of a pneumatic tire according to an embodiment.

FIG. 1 is a plan view of a tread surface of a pneumatic tire according to an embodiment. A pneumatic tire 1 illustrated in FIG. 1 is provided with a tread portion 2 in an outermost portion in the tire radial direction. The surface of the tread portion 2, i.e., the portion that contacts the road surface when a vehicle (not illustrated) mounted with the pneumatic tire 1 runs, is formed as a tread surface 3. A plurality of circumferential main grooves 10 extending in the tire circumferential direction and a plurality of lug grooves 15 extending in the tire lateral direction are each formed in the tread portion 3, and a plurality of blocks 20 serving as land portions are formed by the circumferential main grooves 10 and the lug grooves 15. That is, the blocks 20 are defined by the lug grooves 15 on both sides in the tire circumferential direction, and by the circumferential main grooves 10 on at least one end portion in the tire lateral direction, and thus each of the blocks 20 has a substantially quadrangular shape.

Specifically, five circumferential main grooves 10 are formed aligned in the tire lateral direction, each of the five circumferential main grooves 10 are formed with repeated bending in the tire lateral direction while extending in the tire circumferential direction. That is, the circumferential main grooves 10 extending in the tire circumferential direction are each formed in a zigzag shape. Further, the lug grooves 15 are configured so that the lug grooves 15 that do not penetrate the circumferential main grooves 10 and are adjacent to each other via the circumferential main grooves 10 are formed in positions that differ in the tire circumferential direction. The circumferential main grooves 10 here have a groove width within a range from 3 to 10 mm, both inclusive, and a groove depth within a range from 7 to 25 mm, both inclusive. Further, the lug grooves 15 here have a groove width within a range from 4 to 12 mm, both inclusive, and a groove depth within a range from 5 to 25 mm, both inclusive.

The blocks 20 defined by the circumferential main grooves 10 and the lug grooves 15 are disposed between circumferential main grooves 10 adjacent to each other as well as on the outer side in the tire lateral direction of each of the two circumferential main grooves 10 positioned most outward in the tire lateral direction. Further, a plurality of the blocks 20 positioned in substantially the same position in the tire lateral direction are aligned in series in the tire circumferential direction via the lug grooves 15, forming block rows 25 each in a row shape. Such a block row 25 is formed in four locations between five circumferential main grooves 10, and in two locations outward in the tire lateral direction of the two circumferential main grooves 10 positioned most outward in the tire lateral direction, forming six rows in total. These six block rows 25 are aligned in the tire lateral direction on the tread surface 3. The tread pattern on the tread surface 3 of the pneumatic tire 1 according to the present embodiment is thus a so-called block pattern provided with land portions formed by the plurality of blocks 20.

Further, the pneumatic tire 1 according to the present embodiment has a specified rotation direction when mounted on a vehicle. In the description below, a leading side in the tire rotation direction is the rotation direction side when the pneumatic tire 1 rotates in the specified direction and, is the side that first contacts and first separates from the road surface when the pneumatic tire 1 is mounted on a vehicle, rotated in the specified direction, and run. Further, a trailing side in the tire rotation direction is a side opposite to the rotation direction side when the pneumatic tire 1 rotates in the specified direction and, is the side that later contacts and separates from the road surface when the pneumatic tire 1 is mounted on a vehicle, rotated in the specified direction, and run. Each of the lug grooves 15 is inclined in a direction toward the trailing side in the tire rotation direction, as it goes from the tire equator line CL side to an outer side in the tire lateral direction. That is, the lug grooves 15 are each inclined in a direction toward the trailing side in the tire rotation direction, from an inner side toward the outer side in the tire lateral direction while extending in the tire circumferential direction. Note that the lug grooves 15 do not need to be inclined in the tire circumferential direction while extending in the tire lateral direction in all positions in which the lug grooves 15 define the blocks 20 in the tire circumferential direction. At least a portion of the lug grooves 15 that define the leading side of the blocks 20 in the tire rotation direction may be inclined in a direction toward the trailing side in the tire rotation direction, as it goes from the tire equator line CL side toward the outer side in the tire lateral direction.

Further, each of the blocks 20 of the six block rows 25 include narrow grooves 30. In the four of the six block rows 25 other than the two rows outward in the tire lateral direction, the narrow grooves 30 open to the circumferential main grooves 10 and the lug grooves 15 that define each of the blocks 20. Further, in the two of the six block rows 25 outward in the tire lateral direction, the narrow grooves 30 open to the circumferential main groove 10 that defines each of the blocks 20 as well as to the outer sides of the blocks 20 in the tire lateral direction. Further, the narrow grooves 30 are each formed in substantially the same form in each of the blocks 20 of the four block rows 25 other than the two rows outward in the tire lateral direction, and in substantially the same form in each of the blocks 20 of the two block rows 25 outward in the tire lateral direction.

The narrow grooves 30 here each have a groove width within a range from 1 to 2 mm, both inclusive, and a groove depth within a range from 1 to 15 mm, both inclusive, and include a sipe. Here, "sipe" refers to a groove formed into a narrow shape in the tread surface 3. When the pneumatic tire 1 is mounted on a regular rim, inflated to a regular internal pressure, and placed under no load conditions, wall surfaces constituting the sipe do not come into contact with each other. When the sipe is positioned in a portion of a ground contact surface formed on a flat plate with a load applied in a vertical direction on the plate, or when the block 20 where the sipe is formed collapses, the wall surfaces constituting the sipe, or at least portions of areas disposed on the wall surfaces, come into contact with each other as a result of deformation of the block 20. Here, "regular rim" refers to a "standard rim" defined by the Japan Automobile Tyre Manufacturers Association Inc. (JATMA), a "design rim" defined by the Tire and Rim Association, Inc. (TRA), or a "measuring rim" defined by the European Tyre and Rim Technical Organisation (ETRTO). "Regular internal pressure" refers to "maximum air pressure" defined by JATMA, a maximum value given in "Tire Load Limits at Various Cold Inflation Pressures" defined by TRA, or "Inflation Pressures" defined by ETRTO. The narrow grooves 30 in the present embodiment, even when positioned on the ground contact surface, maintain a state in which the groove walls are separated from each other, and include such a sipe.

Figure 2:
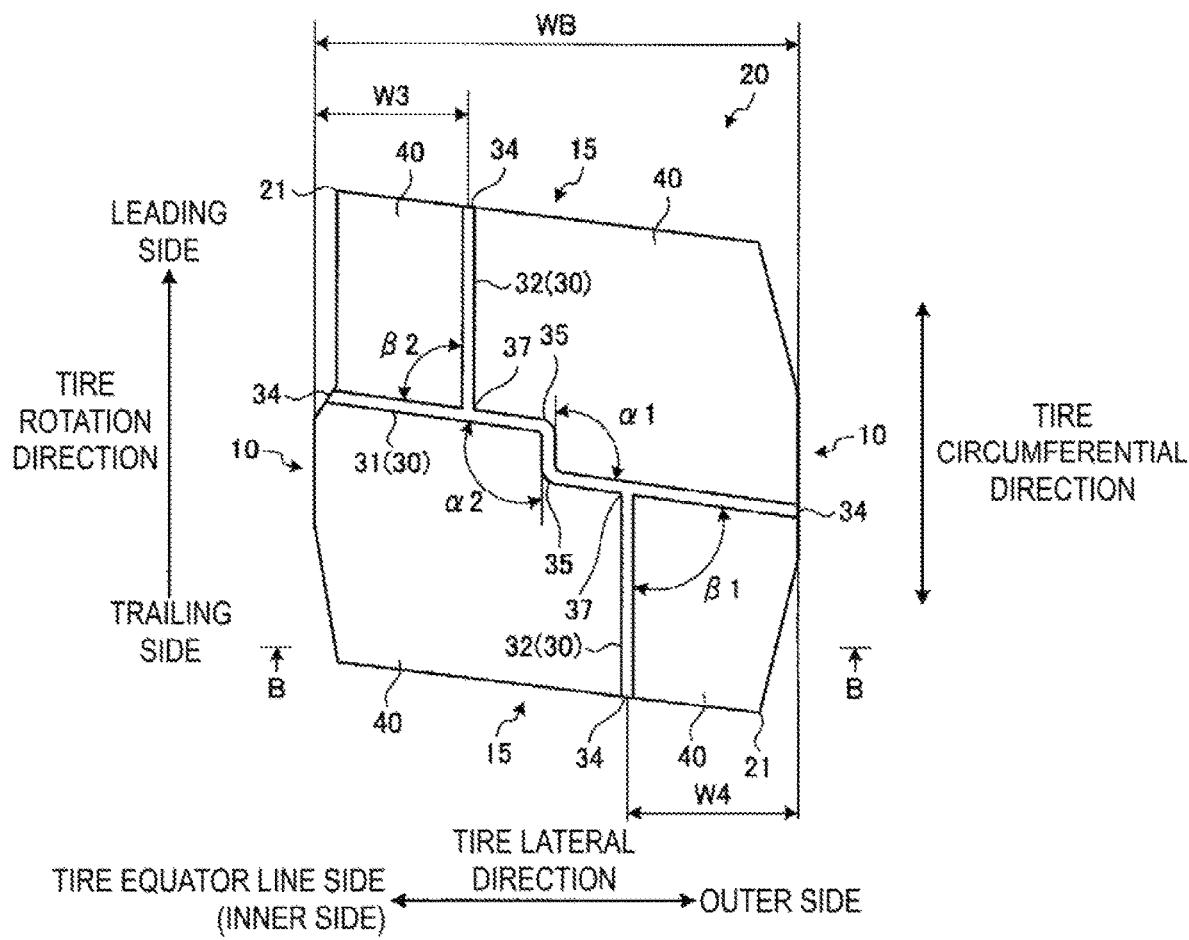
FIG. 2 is a detailed view of part A of FIG. 1.

FIG. 2 is a detailed view of part A of FIG. 1. The lug grooves 15 that define both sides of the block 20 in the tire circumferential direction incline in a direction toward the trailing side in the tire rotation direction, as it goes from the tire equator line CL side toward the outer side in the tire lateral direction, and thus an end portion on the tire equator line CL side in the tire lateral direction of the block 20 is positioned on a frontmost side in the tire rotation direction at an edge portion 21 on the leading side in the tire rotation direction. Further, at the edge portion 21 on the trailing side of the block 20 in the tire rotation direction, an end portion on the outer side in the tire lateral direction is positioned on the backmost side in the tire rotation direction.

Further, in the blocks 20 constituting the four block rows 25 other than the two block rows 25 positioned on both end sides in the tire lateral direction, the narrow grooves 30 include a lateral narrow groove 31 extending in the tire lateral direction, and circumferential narrow grooves 32 extending in the tire circumferential direction. The lateral narrow groove 31 of the narrow grooves 30 has at least one end that opens to the circumferential main grooves 10 defining the block 20. Further, the circumferential narrow grooves 32 have at least one end that opens to the lug grooves 15 defining the block 20.

Specifically, the lateral narrow groove 31 extending in the tire lateral direction is configured so that one end opens to the circumferential main groove 10 that defines the tire lateral direction CL side of the block 20 in the tire lateral direction, and another end opens to the circumferential main groove 10 that defines the outer side of the block 20 in the tire lateral direction. Both ends of the lateral narrow groove 31 thus form opening portions 34 that respectively open to the circumferential main grooves 10.

Further, the lateral narrow groove 31 bends at two locations while extending in the tire lateral direction, and includes two bent portions 35. The two bent portions 35 bend in directions such that the portion of the lateral narrow groove 31 positioned outward from the bent portion 35 in the tire lateral direction is positioned further to the trailing side in the tire rotation direction than the portion of the lateral narrow groove 31 positioned inward from the bent portion 35 in the tire lateral direction. These two bent portions 35 are positioned in a central region of the block 20 in the tire lateral direction at different positions in the tire circumferential direction, and the portion of the lateral narrow groove 31 between the bent portions 35 extends in the tire circumferential direction at a short length. In other words, the lateral narrow groove 31 bends at the two bent portions 35, forming a so-called crank-like shape.

Further, two of the circumferential narrow grooves 32 are provided, and these two circumferential narrow grooves 32 are positioned further outward of the block 20 in the tire lateral direction than the bent portions 35 of the lateral narrow groove 31. That is, one circumferential narrow groove 32, of the two circumferential narrow grooves 32, is positioned inward from the bent portions 35 in the tire lateral direction, and the other circumferential narrow groove 32 is positioned outward from the bent portions 35 in the tire lateral direction. The circumferential narrow groove 32, of the two circumferential narrow groove 32, positioned inward from the bent portions 35 in the tire lateral direction is positioned on the leading side of the lateral narrow groove 31 in the tire rotation direction, and the circumferential narrow groove 32 positioned outward from the bent portions 35 in the tire lateral direction is positioned on the trailing side of the lateral narrow groove 31 in the tire rotation direction.

The circumferential narrow grooves 32, at these positions, are each configured so that one end opens to the lug groove 15, and the other end intersects the lateral narrow groove 31, connecting and opening to the lateral narrow groove 31. Specifically, the circumferential narrow groove 32 positioned inward from the bent portions 35 in the tire lateral direction is configured so that an end portion on the leading side in the tire rotation direction is an opening portion 34 that opens to the lug groove 15, and an end portion on the trailing side in the tire rotation direction is connected to the lateral narrow groove 31. Further, the circumferential narrow groove 32 positioned outward from the bent portions 35 in the tire lateral direction is configured so that an end portion on the trailing side in the tire rotation direction is an opening portion 34 that opens to the lug groove 15, and an end portion on the leading side in the tire rotation direction is connected to the lateral narrow groove 31.

A portion where the circumferential narrow groove 32 and the lateral narrow groove 31 intersect form an intersection point 37, and the narrow grooves 30 include two intersection points 37 formed by the two circumferential narrow grooves 32 intersecting one lateral narrow groove 31. That is, the narrow grooves 30 configured to include two intersection points 37 by two circumferential narrow grooves 32 being provided as one of the narrow grooves 30, and the two circumferential narrow grooves 32 intersecting the lateral narrow groove 31, which is another narrow groove 30. The bent portions 35 of the lateral narrow groove 31 are positioned between the two intersection points 37 in the tire lateral direction.

Further, the narrow grooves 30 are configured so that a distance W3 in the tire lateral direction between one of the two opening portions 34 that open to the lug groove 15 and, among both ends of the block 20 in the tire lateral direction, the end portion near the opening portion 34 is within a range of 0.15≤(W3/WB)≤0.40 with respect to a width WB of the block 20 in the tire lateral direction. Specifically, the distance W3 in the tire lateral direction between the opening portion 34 of, among the two circumferential narrow grooves 32, the circumferential narrow groove 32 positioned on the leading side in the tire rotation direction, and the end portion of the block 20 in the tire lateral direction near the opening portion 34 is within the range of 0.15≤(W3/WB)≤0.40 with respect to the width WB of the block 20.

Similarly, a distance W4 in the tire lateral direction between the other of the two opening portions 34 of the narrow groove 30 that open to the lug groove 15 and, among both ends of the block 20 in the tire lateral direction, the end portion near the opening portion 34 is within a range of 0.15≤(W4/WB)≤0.40 with respect to the width WB of the block 20 in the tire lateral direction. In other words, the distance W4 in the tire lateral direction between the opening portion 34 of, among the two circumferential narrow grooves 32, the circumferential narrow groove 32 positioned on the trailing side in the tire rotation direction, and the end portion of the block 20 in the tire lateral direction near the opening portion 34 is within the range of 0.15≤(W4/WB)≤0.40 with respect to the width WB of the block 20 in the tire lateral direction.

Note that the positions of the opening portions 34 in the distances W3, W4 are the center in the opening width of the opening portions 34 in the tire lateral direction. Further, preferably the distance W3 and the distance W4 are about the same.

Further, the narrow grooves 30 are configured so that a bend angle α1 of the narrow groove 30 at one of the two bent portions 35 and a bend angle α2 of the narrow groove 30 at the other bent portion 35 are within ranges of 90°≤α1≤120° and 90°≤α2≤120°, respectively. For example, of the two bent portions 35 of the narrow groove 30, when α1 is defined as the bend angle of the bent portion 35 positioned on the trailing side in the tire rotation direction, the bend angle α1 is within the range of 90°≤α1≤120°. Similarly, of the two bent portions 35, when α2 is defined as the bend angle of the bent portion 35 positioned on the leading side in the tire rotation direction, the bend angle α2 is within the range of 90°≤α2≤120°. Note that the bend angles α1, α2 in this case are both minor angles of the bent portions 35.

Further, the narrow grooves 30 are configured so that a bend angle β1 between the narrow grooves 30 at one of the two intersection points 37 and a bend angle β2 between the narrow grooves 30 at the other intersection point 37 are within ranges of 70°≤β1≤90° and 70°≤β2≤90°, respectively. For example, angle β1 between the circumferential narrow groove 32 and the lateral narrow groove 31 that intersect at the intersection point 37 of the two intersection points 37 positioned outward in the tire lateral direction is within the range of 70°≤β1≤90°. Similarly, angle β2 between the circumferential narrow groove 32 and the lateral narrow groove 31 that intersect at the intersection point 37 of the two intersection points 37 positioned inward in the tire lateral direction is within the range of 70°≤β2≤90°. Note that when the angles β1, β2 of the narrow grooves 30 in this case are other than 90°, the angles β1, β2 become relative angles on the acute angle side of the circumferential narrow groove 32 and the lateral narrow groove 31 that intersect at the intersection point 37.

Figure 3:
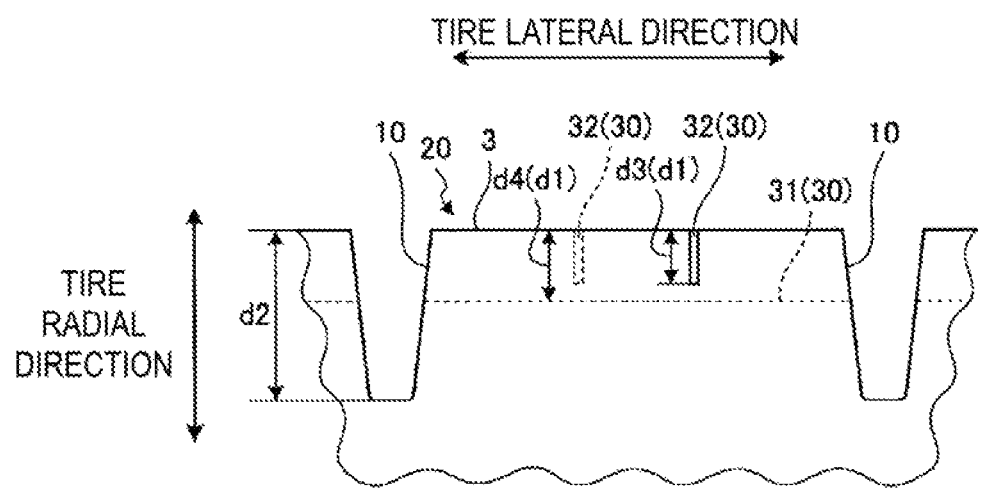
FIG. 3 is a cross-sectional view taken along B-B of FIG. 2.

FIG. 3 is a cross-sectional view taken along B-B of FIG. 2. The narrow grooves 30 have a groove depth d1 within a range of 0.05≤(d1/d2)≤0.50 with respect to a groove depth d2 of the circumferential main groove 10. Further, the narrow grooves 30 each have two or more groove depths and, in the present embodiment, the groove depths differ in the lateral narrow groove 31 and the circumferential narrow groove 32 of the narrow grooves 30. Specifically, a groove depth d4 of the lateral narrow groove 31 is greater than a groove depth d3 of the circumferential narrow groove 32, and the relationship between the groove depth d3 of the circumferential narrow groove 32 and the groove depth d4 of the lateral narrow groove 31 is within a range of 0.5≤(d3/d4)≤0.8.

The block 20 is defined into three or more small blocks 40 by the narrow grooves 30. That is, the lateral narrow groove 31 and the circumferential narrow grooves 32 of the narrow grooves 30 are connected to the circumferential main grooves 10 and the lug grooves 15, and the lateral narrow groove 31 and the circumferential narrow grooves 32 are connected to each other. Thus, the blocks 20 are divided into a plurality of regions in a plan view by the narrow grooves 30, each region being a small block 40. According to the present embodiment, four small blocks 40 are formed in each of the blocks 20. That is, the blocks 20 are each separated in the tire circumferential direction by the lateral narrow grooves 31, and each of the regions separated in the tire circumferential direction are further separated in the tire lateral direction by the circumferential narrow grooves 32, thereby defining the block 20 into four of the small blocks 40.

In the blocks 20 of the four of the six block rows 25 other than the two block rows 25 positioned on both end sides in the tire lateral direction, the narrow grooves 30 are formed in the form described above, defining each of the blocks 20 into four of the small blocks 40. Further, in the blocks 20 of the two of the six block rows 25 positioned on both end sides in the tire lateral direction, only the lateral narrow groove 31 is formed as the narrow groove 30 and not the circumferential narrow groove 32.

The pneumatic tire 1 according to the present embodiment thus configured is applied to a heavy duty pneumatic tire. When mounted on a vehicle, the pneumatic tire 1 is mounted on a rim wheel and then mounted with the rim on the vehicle in an inflated state. The pneumatic tire 1 mounted on the rim wheel is mounted on a large vehicle such as a truck or a bus, for example.

When a vehicle with the pneumatic tire 1 mounted thereon runs, the pneumatic tire 1 rotates while the tread surface 3 of the tread surface 3 located at the bottom contacts the road surface. When a vehicle with the pneumatic tire 1 mounted thereon run on dry road surfaces, the vehicle mainly run by a friction force between the tread surface 3 and the road surface. This friction force transmits a driving force and a braking force to the road surface and generates a swivel force. Further, when the vehicle runs on wet road surfaces, the vehicle runs while water between the tread surface 3 and the road surface enters the circumferential main grooves 10, the lug grooves 15, and the like, and is discharged by these grooves. In this way, the tread surface 3 readily contacts the road surface, allowing the vehicle to run by the friction force between the tread surface 3 and the road surface.

Further, when the vehicle run on icy and snowy road surfaces, the edges serving as boundary portions between the tread surface 3 and the grooves get caught on the icy and snowy road surfaces, making it possible to produce resistance between the tread surface 3 and the icy and snowy road surfaces and generate traction. Additionally, in the pneumatic tire 1 according to the present embodiment, the narrow grooves 30 are formed in the blocks 20. Accordingly, the number of edge components of each of the blocks 20 increases and the number of edge components of the tread surface 3 in its entirety increases, making it possible to ensure traction performance as well as performance on snow and ice during running on icy and snowy road surfaces. Further, the narrow groove 30 formed in the block 20 includes two bent portions 35 and two intersection points 37. As a result, the narrow groove 30 can maintain sufficient edge components and the edge effect can be exhibited in various directions, making it possible to improve performance on snow and ice.

Further, when the pneumatic tire 1 rotates, a hitting sound is generated when the blocks 20 contact the road surface and this hitting sound expands to the periphery, producing noise. However, the bent portions 35 are formed in the narrow grooves 30 formed in the blocks 20, and thus the air compressed by sound readily accumulates in the narrow grooves 30. Further, the intersection points 37 are formed in the narrow groove 30, and the circumferential narrow grooves 32 and the lateral narrow groove 31 intersect at the intersection points 37, and thus the compressed air that flows in the narrow grooves 30 is readily dispersed by the intersection points 37. Thus, the compressed air that flows through the narrow grooves 30 does not readily flow to the circumferential main grooves 10, reducing the amount of sound that flows outside the contact patch. As a result, it is possible to improve performance on snow and ice and reduce noise in a compatible manner.

Further, the bent portions 35 of the narrow groove 30 are each positioned between the intersection points 37 in the tire lateral direction and thus, even when a portion of the compressed air that flows through the narrow groove 30 passes through the bent portions 35, the air can be dispersed at the positions of the intersection points 37, making it possible to more reliably decrease the likelihood that the compressed air that flows through the narrow groove 30 will flow in the direction of the circumferential main grooves 10. Further, the circumferential narrow grooves 32 of the narrow grooves 30 open to the lug grooves 15, and the lateral narrow groove 31 opens to the circumferential narrow grooves 10, and thus the narrow grooves 30 readily open and close in a groove width direction. Thus, even when snow enters the narrow grooves 30, the narrow grooves 30 open in the groove width direction, making it possible to discharge snow and maintain performance on snow. Further, the narrow grooves 30 open to the lug grooves 15 and the circumferential main grooves 10, allowing the water in the narrow grooves 30 to be readily discharged to the lug grooves 15 and the circumferential main grooves 10 sides, making it possible to maintain performance on ice. As a result, it is possible to more reliably improve performance on snow and ice and reduce noise in a compatible manner.

Further, the distances W3, W4 in the tire lateral direction between the opening portions 34 of the circumferential narrow grooves 32 and the end portions of the block 20 in the tire lateral direction are within the ranges of $0.15 \le (W3/WB) \le 0.40$ and $0.15 \le (W4/WB) \le 0.40$, making it possible to suppress block breakage and improve performance on snow and ice. That is, when the relationships between the distances W3, W4 and the width WB of the block 20 are $(W3/WB)<0.15$ and $(W4/WB)<0.15$, the opening portion 34 of the circumferential narrow groove 32 is too close to the end portion of the block 20, potentially increasing likelihood of block breakage generation. Further, when the relationships between the distances W3, W4 and the width WB of the block 20 are $(W3/WB)>0.40$ and $(W4/WB)>0.40$, the intersection point 37 and the bent portion 35 are too close to each other, making it less likely to exhibit independent edge effects by the intersection points 37 and the bent portions 35, and potentially less likely to achieve sufficient performance on snow and ice. In contrast, when the relationships between the distances W3, W4 and the width WB of the block 20 is within the ranges of $0.15 \le (W3/WB) \le 0.40$ and $0.15 \le (W4/WB) \le 0.40$, the distance between the opening portion 34 of the circumferential narrow groove 32 and the end portion of the block 20, and the distance between the intersection point 37 and the bent portion 35 can each be appropriately set. As a result, performance on snow and ice can be more reliably improved while suppressing block breakage.

Further, the groove depth d1 of the narrow groove 30 is within the range of $0.05 \le (d1/d2) \le 0.50$ with respect to the groove depth d2 of the circumferential main groove 10, making it possible to improve performance on snow and ice while suppressing noise caused by the narrow groove 30. In other words, when the relationship between the groove depth d1 of the narrow groove 30 and the groove depth d2 of the circumferential main groove 10 is $(d1/d2)<0.05$, the groove depth d1 of the narrow groove 30 is too small, potentially making it difficult to sufficiently achieve the effect of improving performance on snow and ice by the narrow groove 30. Further, when the relationship between the groove depth d1 of the narrow groove 30 and the groove depth d2 of the circumferential main groove 10 is $(d1/d2)>0.50$, the groove depth d1 of the narrow groove 30 is too large, potentially increasing the noise when the positions where the narrow grooves 30 are formed contact the ground. In contrast, when the relationship between the groove depth d1 of the narrow groove 30 and the groove depth d2 of the circumferential main groove 10 is within the range of $0.05 \le (d1/d2) \le 0.50$, it is possible to more reliably exhibit the effect of improving performance on snow and ice while suppressing noise caused by the narrow groove 30. As a result, it is possible to more reliably improve performance on snow and ice and reduce noise in a compatible manner.

Further, the narrow grooves 30 are configured so that the relationship between the groove depth d3 of the circumferential narrow groove 32 and the groove depth d4 of the lateral narrow groove 31 is within the range of $0.5 \le (d3/d4) \le 0.8$, making it possible to suppress noise while suppressing the generation of cracks. That is, when the relationship between the groove depth d3 of the circumferential narrow groove 32 and the groove depth d4 of the lateral narrow groove 31 is $(d3/d4)<0.5$, the difference between the groove depth d3 of the circumferential narrow groove 32 and the groove depth d4 of the lateral narrow groove 31 is too large, increasing the likelihood of stress concentration when a load acts on the blocks 20 and potentially generating cracks from the narrow grooves 30. Further, when the relationship between the groove depth d3 of the circumferential narrow groove 32 and the groove depth d4 of the lateral narrow groove 31 is $(d3/d4)>0.8$, the groove depth d3 of the circumferential narrow groove 32 is too large, potentially increasing the noise when the positions where the circumferential narrow grooves 32 are formed contact the ground. In contrast, when the relationship between the groove depth d3 of the circumferential narrow groove 32 and the groove depth d4 of the lateral narrow groove 31 is within the range of $0.5 \le (d3/d4) \le 0.8$, it is possible to suppress the generation of cracks and suppress noise caused by the circumferential narrow grooves 32. As a result, it is possible to more reliably reduce noise while suppressing crack generation.

Further, the two angles $\beta1$, $\beta2$ between the lateral narrow groove 31 and the circumferential narrow grooves 32 intersecting at the two intersection points 37 are within the ranges of $70°\leq\beta1\leq90°$ and $70°\leq\beta2\leq90°$, respectively, making it possible to exhibit the edge effect in a greater number of directions and increase performance on snow and ice. In other words, when the angles $\beta1$, $\beta2$ are $\beta1\leq70°$ and $\beta2\leq70°$, the relative angles between the intersecting lateral narrow groove 31 and the circumferential narrow grooves 32 are too small, restricting the directions in which the edge effect is exhibited and potentially decreasing the likelihood that performance on snow and ice will be sufficiently exhibited. In contrast, when the two angles $\beta1$, $\beta2$ between the lateral narrow groove 31 and the circumferential narrow grooves 32 intersecting at the two intersection points 37 are within the ranges of $70°\leq\beta1\leq90°$ and $70°\leq\beta2\leq90°$, it is possible to exhibit the edge effect in a greater number of directions. As a result, performance on snow and ice can be more reliably improved.

Further, the narrow groove 30 are configured so that the bend angles $\alpha1$, $\alpha2$ of the two bent portions 35 are within the ranges of $90°\leq\alpha1\leq120°$ and $90°\leq\alpha2\leq120°$, respectively, making it possible to more reliably improve performance on snow and ice by the edge effect while reducing noise. That is, when the bend angles $\alpha1$, $\alpha2$ of the bent portions 35 are $\alpha1\leq90°$ and $\alpha2\leq90°$, the portions on both sides of the narrow groove 30 that sandwich the bent portion 35 are close to each other, making it difficult to exhibit the independent edge effects by the respective portions and potentially decreasing the likelihood of effectively improving performance on snow and ice. Further, when the bend angles $\alpha1$, $\alpha2$ of the bent portions 35 are $\alpha1>120°$ and $\alpha2>120°$, compressed air more readily flows into the narrow groove 30 and thus into the circumferential main grooves 10, potentially decreasing the likelihood of noise reduction. In contrast, when the bend angles $\alpha1$, $\alpha2$ of the bent portions 35 are within the ranges of $90°\leq\alpha1\leq120°$ and $90°\leq\alpha2\leq120°$, it is possible to exhibit the edge effect independently by the portions on both sides of the narrow groove 30 that sandwich the bent portion 35 while more reliably suppressing the flow of compressed air through the narrow groove 30 and into the circumferential main grooves 10. As a result, it is possible to more reliably improve performance on snow and ice and reduce noise in a compatible manner.

Further, the narrow grooves 30 are formed in the blocks 20 of the plurality of block rows 25, making it possible to more reliably increase the edge components of the tread surface 3. As a result, performance on snow and ice can be more reliably improved.

Further, the narrow grooves 30 are formed in the blocks 20 of the four block rows 25 other than the two block rows 25 positioned on both end sides in the tire lateral direction, making it possible to decrease the likelihood that the air compressed in the narrow grooves 30 will flow to the circumferential main groove 10 side while maintaining sufficient edge components in a wider range of the tread surface 3. As a result, it is possible to more reliably improve performance on snow and ice and reduce noise in a compatible manner.

Further, the bent portions 35 bend such that the portion of the narrow groove 30 positioned outward from the bent portion 35 in the tire lateral direction is configured to bend further in directions positioned on the trailing side in the tire rotation direction than the portion of the narrow groove 30 positioned inward from the bent portion 35 in the tire lateral direction, thereby making it possible to decrease the surface area of the portion that initially contacts the ground at the time of ground contact by the block 20 and readily increases in ground contact pressure. That is, when the tread surface 3 contacts the road surface, a ground contact pressure in a central region in the tire lateral direction of the ground contact region increases. As a result, a loud hitting sound is readily produced when the region on the tire equator line CL side in the tire lateral direction contacts the ground during ground contact by each of the blocks 20. Further, in the pneumatic tire 1 according to the present embodiment, the portion of the narrow groove 30 positioned inward from the bent portion 35 in the tire lateral direction is positioned on the leading side in the tire rotation direction than the portion of the narrow groove 30 positioned outward from the bent portion 35 in the tire lateral direction, thereby making it possible to decrease the surface area of the portion that initially contacts the ground at the time of ground contact by the block 20 and readily increases in ground contact pressure. As a result, the hitting sound at the time of ground contact by the blocks 20 can be reduced, and thus noise can be more reliably reduced.

Figure 4:
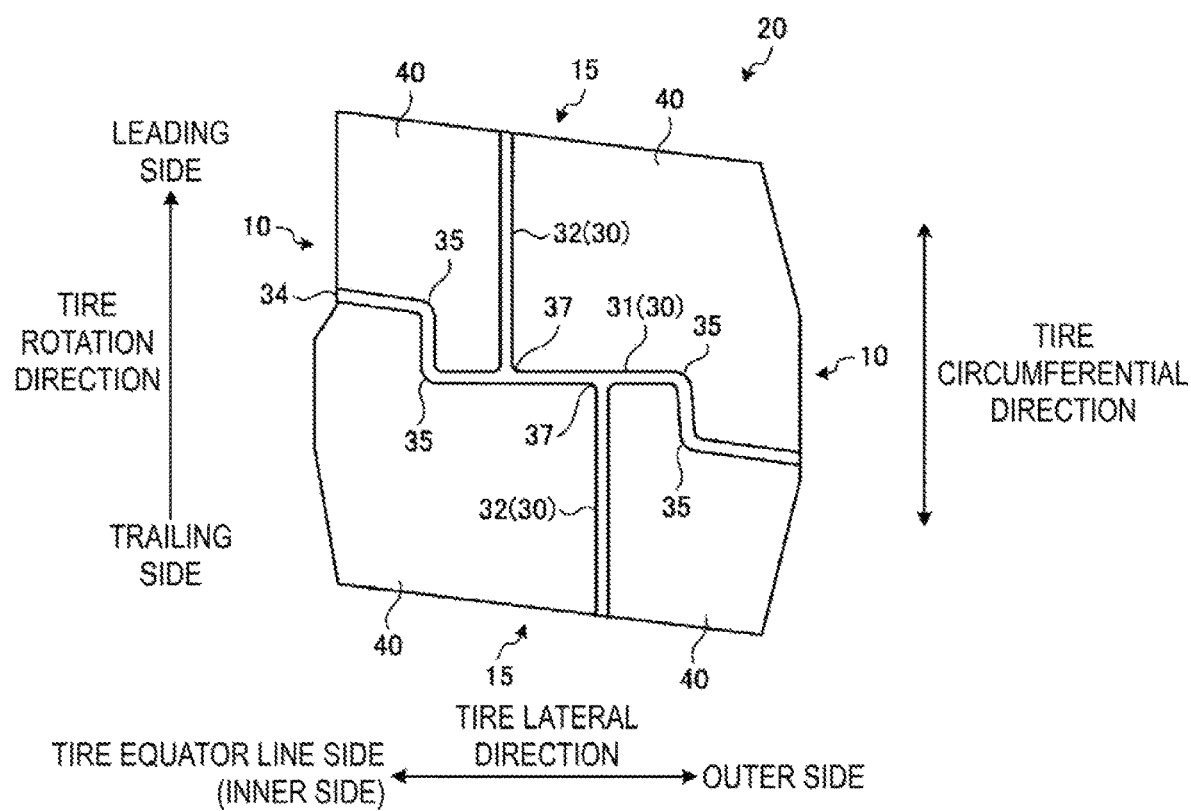
FIG. 4 is a modified example of the pneumatic tire according to an embodiment, and is an explanatory diagram of a case where bent portions are positioned outward of intersection points.

Note that, while in the pneumatic tire 1 according to the embodiment described above, the narrow grooves 30 are configured so that the bent portions 35 are positioned between the intersection points 37, the narrow grooves 30 may be formed in a form other than this. FIG. 4 is a modified example of the pneumatic tire according to an embodiment, and is an explanatory diagram of a case where the bent portions are positioned outward of the intersection points. The narrow grooves 30, for example, may be configured so that two intersection points 37 are formed between two bent portions 35, as illustrated in FIG. 4. As long as a plurality of the bent portions 35 of the narrow grooves 30 and a plurality of the intersection points 37 are formed, the narrow grooves 30 may be formed in a form other than that illustrated in the embodiment described above, and the relative positional relationship between the bent portions 35 and the intersection points 37 is not limited.

Figure 5:
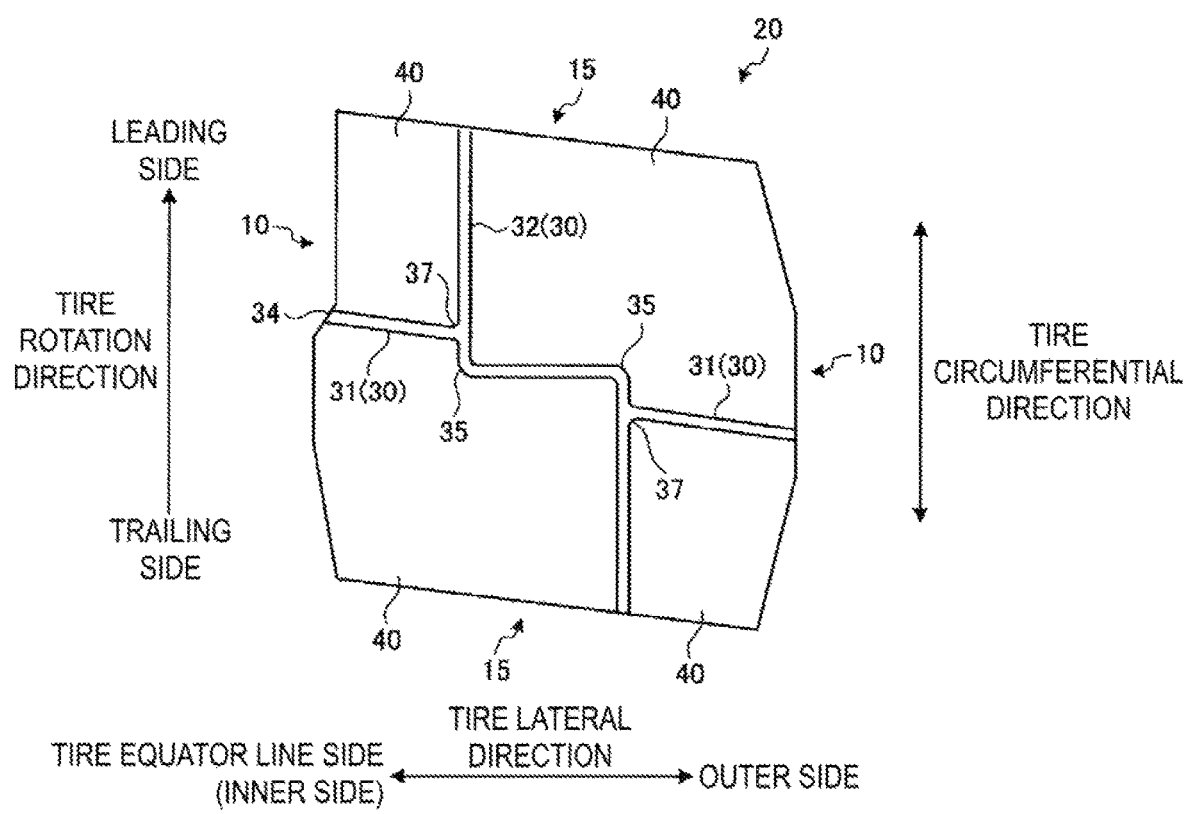
FIG. 5 is a modified example of the pneumatic tire according to an embodiment, and is an explanatory diagram of a case where bent portions are formed in circumferential narrow grooves.

Further, while in the pneumatic tire 1 according to the embodiment described above the bent portions 35 are formed in the lateral narrow groove 31, the bent portions 35 may be formed in an area other than the lateral narrow groove 31. FIG. 5 is a modified example of the pneumatic tire according to an embodiment, and is an explanatory diagram of a case where the bent portions are formed in the circumferential narrow grooves. The bent portions 35 of the narrow grooves 30, for example, may be formed in the circumferential narrow groove 32, and the lateral narrow grooves 31 may be connected to the circumferential narrow groove 32, as illustrated in FIG. 5. Thus, the bent portions 35 may be formed in the circumferential narrow groove 32, and may be formed in both the circumferential narrow groove 32 and the lateral narrow groove 31.

Further, while in the pneumatic tire 1 according to the embodiment described above the narrow grooves 30 are configured so that the groove depth of the lateral narrow groove 31 is greater than the groove depth of the circumferential narrow groove 32, the groove depth of the circumferential narrow groove 32 may be greater than the groove depth of the lateral narrow groove 31. Further, the groove depth of the narrow groove 30 may differ for each of the blocks 20, and may be formed at three or more depths within each of the blocks 20. Further, the narrow grooves 30 may be configured so that, for example, the lateral narrow groove 31 is a regular groove in which the groove walls are continuously spaced apart even when the block 20 contacts the ground, and the circumferential narrow groove 32 may be formed by a sipe or the like, resulting in a mixture of regular groove and sipes.

EXAMPLES

FIGS. 6A to 6F are tables listing the results of performance tests of pneumatic tires. In relation to the pneumatic tire 1 described above, performance evaluation tests conducted on a pneumatic tire of a conventional example and the pneumatic tires 1 according to embodiments of the present technology will be described below. The performance evaluations tests were conducted on performance on snow and ice, which is traction performance when driving on icy and snowy road surfaces, pass-by noise which is noise produced as the pneumatic tire 1 rolls, and cracks or block breakage from the narrow groove 30 indicating failure of the block 20.

The performance evaluation tests were conducted by mounting the pneumatic tire 1 having a size of 315/70R22.5 defined by ETRTO on a regular rim, adjusting the air pressure to 900 kPa, mounting the tire onto a 2-D test vehicle, and then running tests. Each test item for performance on snow and ice was evaluated by having panelists run the test vehicle with the pneumatic tire 1 to be evaluated mounted thereon, and conducting a feeling evaluation when driving the test vehicle on a test course that included snow-covered and icy road surfaces. Performance on snow and ice is expressed by using the evaluation result of Conventional Example described later as an index value of 100. A larger index value indicates a greater degree of excellence in performance on snow and ice. Further, pass-by noise was evaluated on the basis of the measured volume of exterior pass-by noise in accordance with a tire noise test method defined in ECE (Economic Commission for Europe) Regulation No. 117 Revision 2 (ECE R117-02). In this test, the test vehicle run from an area at a sufficient distance in front of a noise measurement section, the engine was stopped immediately in front of the section, and a maximum noise level dB (noise level within a frequency range of from 800 to 1200 Hz) in the noise measurement section during coasting was measured at a plurality of speeds obtained by substantially equally dividing a speed range into eight or more intervals of ±10 km/h with respect to a standard speed, and setting the average as the exterior pass-by noise. The maximum noise level dB is a sound pressure dB (A) measured through an A-characteristic frequency correction circuit using a stationary microphone installed 7.5 m laterally from a running center line at an intermediate point in the noise measurement section and at a height of 1.2 m from the road surface. Further, cracks and block breakage from the narrow groove 30 was evaluated based on the generation of cracks and block breakage from the narrow groove 30 after driving 50000 km with a market monitor, and expressed by using the evaluation result of Conventional Example described later as an index value of 100. A larger index value indicates less cracks and block breakage.

Performance evaluation tests were conducted on 34 pneumatic tires, namely a pneumatic tire of Conventional Example, which is one example of the pneumatic tire 1 in the related art, and Examples 1 to 33 which are the pneumatic tires 1 according to the present technology. Among these pneumatic tires 1, in the pneumatic tire of Conventional Example, the narrow grooves 30 including the bent portions 35 are formed in the blocks 20, but do not include the intersection points 37.

In contrast, in Examples 1 to 33, which are examples of the pneumatic tire 1 according to the present technology, the narrow grooves 30 each including two bent portions 35 and two intersection points 37 are formed in the blocks 20. Further, in the pneumatic tires 1 according to Examples 1 to 33, whether the narrow groove 30 opens to the circumferential main groove 10, the position of the opening portion 34 of the narrow groove 30 with respect to the width of the block 20, the groove depth d1 of the narrow groove 30 with respect to the groove depth d2 of the circumferential main groove 10, the groove depth d3 of the circumferential narrow groove 32 with respect to the groove depth d4 of the lateral narrow groove 31, the angles $\beta1$, $\beta2$ between the narrow grooves 30 at the intersection point 37, the bend angles $\alpha1$, $\alpha2$ of the bent portions 35, the number of block rows 25 in which the narrow groove 30 is disposed, and the absence or presence of rotation directionality of the pneumatic tire 1 are each different.

As shown in FIGS. 6A to 6F, the results of the evaluation tests conducted using these pneumatic tires 1 indicate that the pneumatic tires 1 of Examples 1 to 33 can improve both performance on snow and ice and pass-by noise in comparison with Conventional Example, and can also suppress cracks and block breakage from the narrow groove 30 to the same degree as in Conventional Example. In other words, the pneumatic tires 1 according to Examples 1 to 33 achieve the effect of improving performance on snow and ice and reducing noise in a compatible manner.

The invention claimed is:

1. A pneumatic tire, comprising:
a tread surface;
a plurality of circumferential main grooves formed on the tread surface and extending in a tire circumferential direction;
a plurality of lug grooves formed on the tread surface and extending in a tire lateral direction;
a plurality of blocks defined by the lug grooves on both sides in the tire circumferential direction and by the circumferential main grooves on at least one end portion in the tire lateral direction; and
narrow grooves formed in the blocks;
wherein the narrow grooves comprise a plurality of bent portions, a circumferential narrow groove extending in the tire circumferential direction and a lateral narrow groove extending in the tire lateral direction;
each of the blocks includes only a single one of the lateral narrow groove;
the circumferential narrow groove being provided as a plurality of circumferential narrow grooves, and each of the blocks comprises a plurality of intersection points where the plurality of circumferential narrow grooves intersect the lateral narrow groove; and
the circumferential narrow grooves and the lateral narrow groove have a same groove width;
the intersection points are spaced apart from one another in the tire lateral direction; and
each of the circumferential narrow grooves terminate at the intersection points without extending beyond the lateral narrow groove.

2. The pneumatic tire according to claim 1, wherein the bent portions are each positioned between the intersection points in the tire lateral direction, and the lateral narrow groove opens to at least one of the circumferential main grooves.

3. The pneumatic tire according to claim 2, wherein
the narrow grooves open to the respective lug grooves defining both sides of one of the blocks in the tire circumferential direction, and thus comprise two opening portions;
a distance W3 in the tire lateral direction between one of the two opening portions and, among both ends of the one of the blocks in the tire lateral direction, an end portion near the opening portion is within a range of 0.15≤(W3/WB)≤0.40 with respect to a width WB of the one of the blocks in the tire lateral direction, and
a distance W4 in the tire lateral direction between the other of the two opening portions and, among both ends of the one of the blocks in the tire lateral direction, an end portion near the opening portion is within a range of 0.15≤(W4/WB)≤0.40 with respect to the width WB of the one of the blocks in the tire lateral direction.

4. The pneumatic tire according to claim 3, wherein
the narrow grooves have a groove depth d1 within a range of 0.05≤(d1/d2)≤0.50 with respect to a groove depth d2 of the circumferential main grooves.

5. The pneumatic tire according to claim 4, wherein
the narrow grooves have a groove depth d3 of the circumferential narrow grooves within a range of 0.5≤(d3/d4)≤0.8 with respect to a groove depth d4 of the lateral narrow groove.

6. The pneumatic tire according to claim 5, wherein
the narrow grooves comprise two of the intersection points, and
an angle β1 between the narrow grooves that intersect at one of the intersection points and an angle β2 between the narrow grooves that intersect at the other of the intersection points are within ranges of 70°≤β1≤90° and 70°≤β2≤90°, respectively.

7. The pneumatic tire according to claim 6, wherein
the narrow grooves comprise two of the bent portions, and
a bend angle α1 at one of the bent portions and a bend angle α2 at an other of the bent portions are within ranges of 90°≤α1≤120° and 90°≤α2≤120°, respectively.

8. The pneumatic tire according to claim 7, wherein
the blocks are configured so that a plurality thereof are aligned in the tire circumferential direction, forming block rows,
the tread surface is provided with a plurality of the block rows aligned in the tire lateral direction, and
the narrow grooves are formed in the blocks of the plurality of block rows.

9. The pneumatic tire according to claim 8, wherein
the tread surface is provided with six of the block rows, and
the narrow grooves are formed in at least the blocks of four block rows, among the six block rows, other than the two block rows positioned on both end sides in the tire lateral direction.

10. The pneumatic tire according to claim 9, wherein
the pneumatic tire has a specified rotation direction, and
the bent portions bend such that a portion of the narrow grooves positioned outward from the bent portions in the tire lateral direction is configured to bend further in directions positioned on a trailing side in a tire rotation direction than a portion positioned inward from the bent portions in the tire lateral direction.

11. The pneumatic tire according to claim 1, wherein
the narrow grooves open to the respective lug grooves defining both sides of one of the blocks in the tire circumferential direction, and thus comprise two opening portions;
a distance W3 in the tire lateral direction between one of the two opening portions and, among both ends of the one of the blocks in the tire lateral direction, an end portion near the opening portion is within a range of 0.15≤(W3/WB)≤0.40 with respect to a width WB of the one of the blocks in the tire lateral direction, and
a distance W4 in the tire lateral direction between the other of the two opening portions and, among both ends of the one of the blocks in the tire lateral direction, an end portion near the opening portion is within a range of 0.15≤(W4/WB)≤0.40 with respect to the width WB of the one of the blocks in the tire lateral direction.

12. The pneumatic tire according to claim 1, wherein
the narrow grooves have a groove depth d1 within a range of 0.05≤(d1/d2)≤0.50 with respect to a groove depth d2 of the circumferential main grooves.

13. The pneumatic tire according to claim 1, wherein the narrow grooves have a groove depth d3 of the circumferential narrow grooves within a range of 0.5≤(d3/d4)≤0.8 with respect to a groove depth d4 of the lateral narrow groove.

14. The pneumatic tire according to claim 1, wherein
the narrow grooves comprise two of the intersection points, and
an angle β1 between the narrow grooves that intersect at one of the intersection points and an angle β2 between the narrow grooves that intersect at the other of the intersection points are within ranges of 70°≤β1≤90° and 70°≤β2≤90°, respectively.

15. The pneumatic tire according to claim 1, wherein
the narrow grooves comprise two of the bent portions, and
a bend angle α1 at one of the bent portions and a bend angle α2 at an other of the bent portions are within ranges of 90°≤α1≤120° and 90°≤α2≤120°, respectively.

16. The pneumatic tire according to claim 1, wherein
the blocks are configured so that a plurality thereof are aligned in the tire circumferential direction, forming block rows,
the tread surface is provided with a plurality of the block rows aligned in the tire lateral direction, and
the narrow grooves are formed in the blocks of the plurality of block rows.

17. The pneumatic tire according to claim 16, wherein
the tread surface is provided with six of the block rows, and
the narrow grooves are formed in at least the blocks of four block rows, among the six block rows, other than the two block rows positioned on both end sides in the tire lateral direction.

18. The pneumatic tire according to claim 1, wherein
the pneumatic tire has a specified rotation direction, and
the bent portions bend such that a portion of the narrow grooves positioned outward from the bent portions in the tire lateral direction is configured to bend further in directions positioned on a trailing side in a tire rotation direction than a portion positioned inward from the bent portions in the tire lateral direction.

19. The pneumatic tire according to claim 1, wherein the lateral narrow groove includes the plurality of bent portions between the intersections of the circumferential narrow grooves with the lateral narrow groove in the tire lateral direction.

20. The pneumatic tire according to claim 1, wherein the intersections of the circumferential narrow grooves with the lateral narrow groove are between the bent portions of the lateral narrow groove in the tire lateral direction.

21. The pneumatic tire according to claim 1, wherein the intersection points are spaced apart from one another in the tire circumferential direction.

22. A pneumatic tire, comprising:
- a tread surface;
- a plurality of circumferential main grooves formed on the tread surface and extending in a tire circumferential direction;
- a plurality of lug grooves formed on the tread surface and extending in a tire lateral direction;
- a plurality of blocks defined by the lug grooves on both sides in the tire circumferential direction and by the circumferential main grooves on at least one end portion in the tire lateral direction; and
- narrow grooves formed in the blocks;
- wherein the narrow grooves comprise a plurality of bent portions, a circumferential narrow groove extending in the tire circumferential direction and a lateral narrow groove extending in the tire lateral direction;
- the bent portions are located on a single one of the narrow grooves and are spaced away from any intersections of any of the narrow grooves with the single one of the narrow grooves;
- the lateral narrow groove and the circumferential narrow groove being configured so that at least one thereof is provided in a plurality and comprises a plurality of intersection points where the one intersects the other;
- the circumferential narrow groove and the lateral narrow groove have a same groove width;
- the intersection points are spaced apart from one another in the tire lateral direction; and
- each narrow groove of the plurality of the lateral narrow groove or the circumferential narrow groove terminates at the intersection points without extending beyond the intersection points.

\* \* \* \* \*